United States Patent
Shin (10) Patent No.: US 7,310,312 B2
(45) Date of Patent: Dec. 18, 2007

(54) METHOD FOR CONTROLLING A RADIO ACCESS BEARER IN A COMMUNICATION SYSTEM

(75) Inventor: Sang Rim Shin, Anyang-shi (KR)

(73) Assignee: LG Electronics, Inc., Seoul (KR)

( * ) Notice: Subject to any disclaimer, the term of this patent is extended or adjusted under 35 U.S.C. 154(b) by 162 days.

(21) Appl. No.: 11/072,251

(22) Filed: Mar. 7, 2005

(65) Prior Publication Data
US 2005/0157649 A1     Jul. 21, 2005

Related U.S. Application Data

(63) Continuation of application No. 10/653,943, filed on Sep. 4, 2003, now Pat. No. 7,236,794, which is a continuation of application No. 09/609,644, filed on Jul. 3, 2000, now Pat. No. 6,640,105.

(51) Int. Cl.
*H04L 12/26* (2006.01)

(52) U.S. Cl. ........... 370/235; 455/434; 455/452.1; 455/453

(58) Field of Classification Search ............ 370/235, 370/469, 252, 328, 329, 337; 455/435, 452.1, 455/434, 453
See application file for complete search history.

(56) References Cited

U.S. PATENT DOCUMENTS

| | | | | |
|---|---|---|---|---|
| 5,568,476 A | * | 10/1996 | Sherer et al. | 370/236 |
| 5,757,772 A | * | 5/1998 | Thornberg et al. | 370/236 |
| 5,768,267 A | * | 6/1998 | Raith et al. | 370/329 |
| 5,940,763 A | * | 8/1999 | Alperovich et al. | 455/450 |
| 6,307,843 B1 | * | 10/2001 | Okanoue | 370/312 |
| 6,363,058 B1 | * | 3/2002 | Roobol et al. | 370/310 |
| 6,374,112 B1 | * | 4/2002 | Widegren et al. | 455/452.2 |
| 6,477,670 B1 | * | 11/2002 | Ahmadvand | 714/712 |
| 6,542,490 B1 | * | 4/2003 | Ahamdvand et al. | 370/338 |
| 6,542,516 B1 | * | 4/2003 | Vialen et al. | 370/465 |
| 6,735,217 B1 | * | 5/2004 | Webber et al. | 370/447 |
| 6,963,544 B1 | * | 11/2005 | Balachandran et al. | 370/281 |
| 7,123,628 B1 | * | 10/2006 | Hwang et al. | 370/469 |

OTHER PUBLICATIONS

"MAC Traffic Volume Measurement Function", 3 GPP TSG-RAN meeting #5, 25.321, Kyongju, Korea, Oct. 6-8, 1999, Clauses 8.2, 8.3, 11.
"RRC Traffic Volume Monitoring Procedure", 3 GPP TSG-RAN meeting #5, 25.303, Kyongju, Korea, Oct. 6-8, 1999, Clause 8.

* cited by examiner

*Primary Examiner*—Congvan Tran
(74) *Attorney, Agent, or Firm*—McKenna Long & Aldridge LLP (57) ABSTRACT

A radio access bearer in a mobile communication system is controlled by disposing a radio resource control layer having radio access bearers in a user side, disposing a radio link control layer, a media access control layer, and a physical layer in the user side beneath the radio resource control layer in succession, measuring a traffic volume of the media access control layer and radio link control layer in the user side by using the media access control layer in the user side to produce traffic volume measurements, comparing the traffic volume measurements to at least one of an upper critical value and a lower critical value provided to the media access control layer in the user side from a radio resource control layer in a network side of the communication system through the radio resource control layer in the user side of the system, and forwarding a comparison result and the traffic volume measurements to the radio resource control layer in the network side through the radio resource control layer in the user side, and controlling the radio access bearer in the user side through the radio resource control layer in the network side according to a result of the comparison.

45 Claims, 7 Drawing Sheets

METHOD FOR CONTROLLING A RADIO ACCESS BEARER IN A COMMUNICATION SYSTEM

CROSS REFERENCES TO RELATED APPLICATIONS

This application is a Continuation application of Ser. No. 10/653,943 filed Sep. 4, 2003 (now U.S. Pat. No. 7,236,794), which is hereby incorporated by reference as if fully set forth herein; which is a continuation of U.S. application Ser. No. 09/609,644, filed Jul. 3, 2000 (now U.S. Pat. No. 6,440,105); and this application claims priority to Korean Patent Application No. P1999-26688 filed on Jul. 2, 1999, the entirety of which is hereby incorporated by reference for all purposes as if fully set for therein.

BACKGROUND OF THE INVENTION

1. Field of the Invention

The present invention relates to a next generation mobile communication system, and more particularly, to in a method for controlling a radio access bearer in a next generation mobile communication system.

2. Background of the Related Art

Recently, the Association of Radio Industries and Business (ARIB) in Japan, the European Telecommunications Standards Institute (ETSI) in Europe, the TI in the USA, the Telecommunications Technology Association (TTA) in Korea, and the TTC in Japan have planned a further evolved next generation mobile communication system based both on the core network technology of the existing Global System for Mobile Communications (GSM) which serves for multimedia, such as audio, video and data, and radio access technology. These organizations have agreed on common research for suggesting a technical specification for the evolved next generation mobile communication system, a project named Third Generation Partnership Project (3GPP). The 3GPP encompasses the following three technical research fields.

The first technical research field is the 3GPP system and service field, for researching system architectures and service capabilities based on the 3GPP specification.

The second technical research field is the field of Universal Terrestrial Radio Access Network (UTRAN). The UTRAN is a RAN (Radio Access Network), including W-CDMA according to a Frequency Division Duplex (FDD) mode, and TD-CDMA according to a Time Division Duplex (TDD) mode.

The third technical research field pertains to a core network having a third generation networking capability, such as mobility management and global roaming, being evolved from the second generation GSM.

Of the Technical Specification Groups (TSGs) conducting such technical research, the Working Group 1 (WG1) related to Radio Access Networks (RAN) suggests general technologies for the physical layer (Layer 1), and the Working Group 2 (WG2), defines a data link layer (Layer 2) and a network layer (Layer 3), both being at higher levels than the physical layer, as a second radio layer (Radio Layer 2) and a third radio layer (Radio Layer 3), and suggests general technologies on the second and third radio layers.

Figure 1:
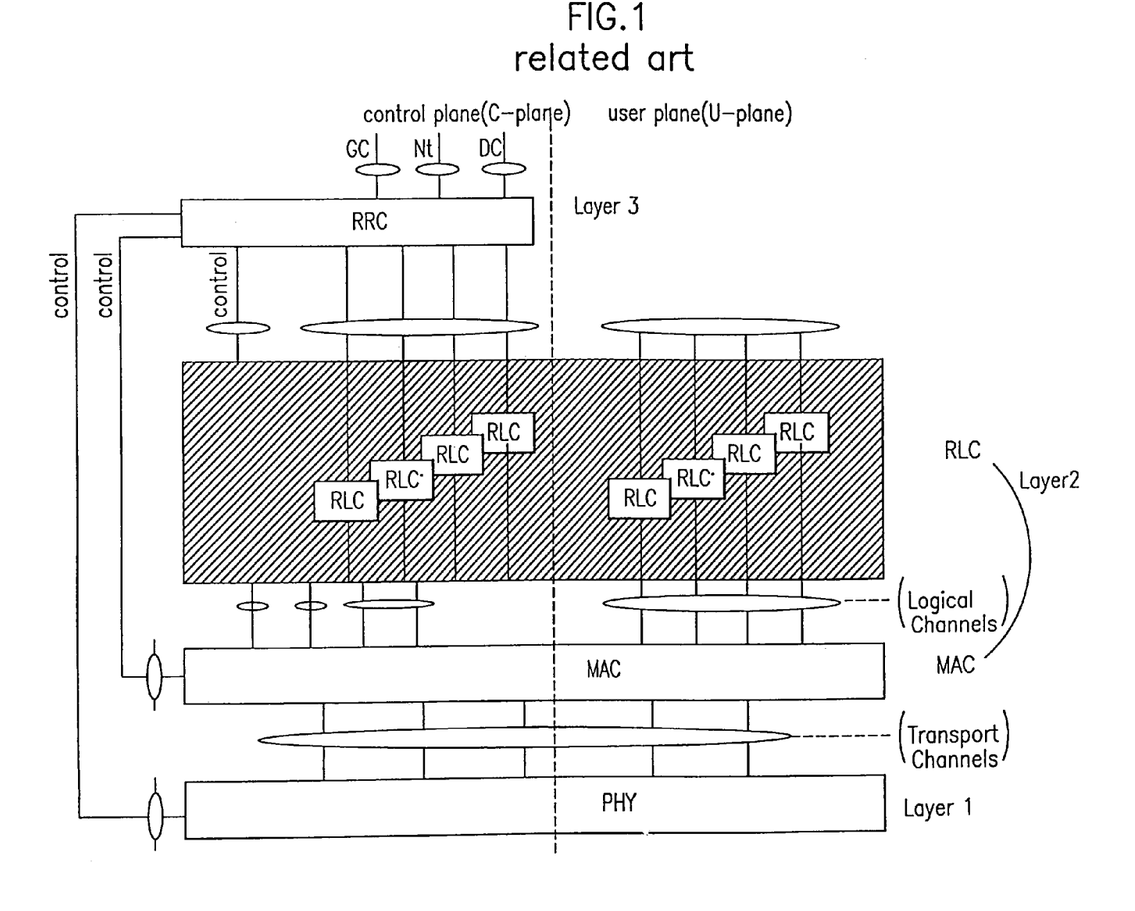
FIG. 1 illustrates a diagram showing a related art radio interface protocol architecture according to the 3GPP RAN.

FIG. 1 illustrates a related art radio interface protocol architecture according to the 3GPP RAN. An air-interface protocol between UE (User Equipment) and a network side (UMTS Terrestrial Radio Access Network, UTRAN) consists of layer 1, radio layer 2, and radio layer 3.

Referring to FIG. 1, a protocol architecture is divided into a control plane (C-Plane) for signaling, and a user plane (U-Plane) for transmission of information. The C-Plane has a Radio Resource Control (RRC) Layer at Layer 3, and a Radio Link Control (RLC) Layer and a Medium Access Control (MAC) Layer at Layer 2, a layer lower than the Layer 3, and a Layer 1 at a lowest layer. The U-Plane has the RLC and MAC at Layer 2, and the Layer 1, a layer lower than the Layer 2. The Layer 1 provides a transport channel for upper layer(s) inclusive of the MAC. In this instance, depending on how information is transferred on the air-interface, different transport channels are provided, i.e., either a common transport channel or a dedicated transport channel is provided.

The MAC provides the upper RLC with logical channels, which differ depending on the forms of information to be transported. That is, the MAC provides the data transfer service on the logical channels, forms of which logical channels differ depending on the kinds of the data transfer services provided by the MAC. In this instance, the forms of the logical channels differ depending on the forms of information to be transported, wherein, in general, control channels are provided when information for the C-Plane is to be transported, and traffic channels are provided when information for the U-Plane is to be transported. Besides this, the MAC provides radio resource reconfiguration and MAC parameter reconfiguration services, which are served when the RRC requests a radio resource reconfiguration or a MAC parameter change. The MAC also provides a measurement report service, reporting traffic volume values, a service quality index, a MAC condition index, and the like to the RRC. The MAC providing those services has many functions, including a traffic volume monitoring function which informs the RRC of the traffic volume on the logical channel. The RRC analyses traffic volume information reported from the MAC, and determines switching for the transport channels.

The RLC provides services for radio access establishment/or cancelation. The RLC also provides a service for transporting PDU (Protocol Data Units) at the upper layer to which any protocol information, inclusive of segmentation/reassembly functions, is not included. The RRC provides an information broadcast service, in which information is broadcast to all UE in an one area. The RRC also controls Layer 3 C-Plane signal processing between the UE the UTRAN. That is, the RRC provides functions of establishment, sustenance, and cancelation of radio resource access between the UE and the UTRAN. Particularly, the RRC provides functions of establishment, sustenance, or cancelation of radio access bearers, functions of assignment, reconfiguration, and cancelation of radio resources required for radio resource access (the bearer is a capability defined for a signal transfer on the radio interface), and UE measurement report and report control functions, corresponding to the traffic volume monitoring function among the functions of the MAC. The measurements at the UE are controlled by the RRC, when the RRC informs the UE of an object, a time and a method of the measurement. Then, the RRC informs the UTRAN of the measurements at the UE. The radio interface protocol layers explained up to now provide other various functions and services. In such an existing radio interface protocol architecture, traffic volume at the RLC is monitored at the MAC in the U-Plane, for the RRC to assign, sustain or cancel radio resources.

However, no detailed procedures for these functions are suggested yet, in fact. That is, as explained, what is described in the 3GPP RAN is only that a RLC traffic volume in a current user system is monitored at the MAC, and only that radio access bearer control procedures, such as bearer reconfiguration, and channel reconfiguration are carried out according to the traffic volume monitoring at the MAC, without any suggestions for detailed procedures for carrying this out.

SUMMARY OF THE INVENTION

Accordingly, the present invention is directed to a method for controlling a radio access bearer in a mobile communication system that substantially obviates one or more of the problems due to limitations and disadvantages of the related art.

An object of the present invention is to provide a method for controlling a radio access bearer in a mobile communication system, for controlling a radio bearer according to traffic volume more accurately.

Another object of the present invention is to provide a method for controlling a radio access bearer in a mobile communication system, for efficient management of radio resources according to traffic volume in a radio interface protocol.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, a method for controlling a radio access bearer in a mobile communication system, comprising: (1) disposing a radio resource control layer having radio access bearers in a user side of the communication system; (2) disposing a radio link control layer, a media access control layer, and a physical layer in the user side beneath the radio resource control layer in succession; (3) measuring a traffic volume of the media access control layer and radio link control layer in the user side by using the media access control layer in the user side to produce traffic volume measurements; (4) comparing the traffic volume measurements to at least one of an upper critical value and a lower critical value provided to the media access control layer in the user side from a radio resource control layer in a network side of the communication system through the radio resource control layer in the user side of the system, and forwarding a comparison result and the traffic volume measurements to the radio resource control layer in the network side through the radio resource control layer in the user side; and (5) controlling the radio access bearer in the user side through the radio resource control layer in the network side according to a result of the comparison.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
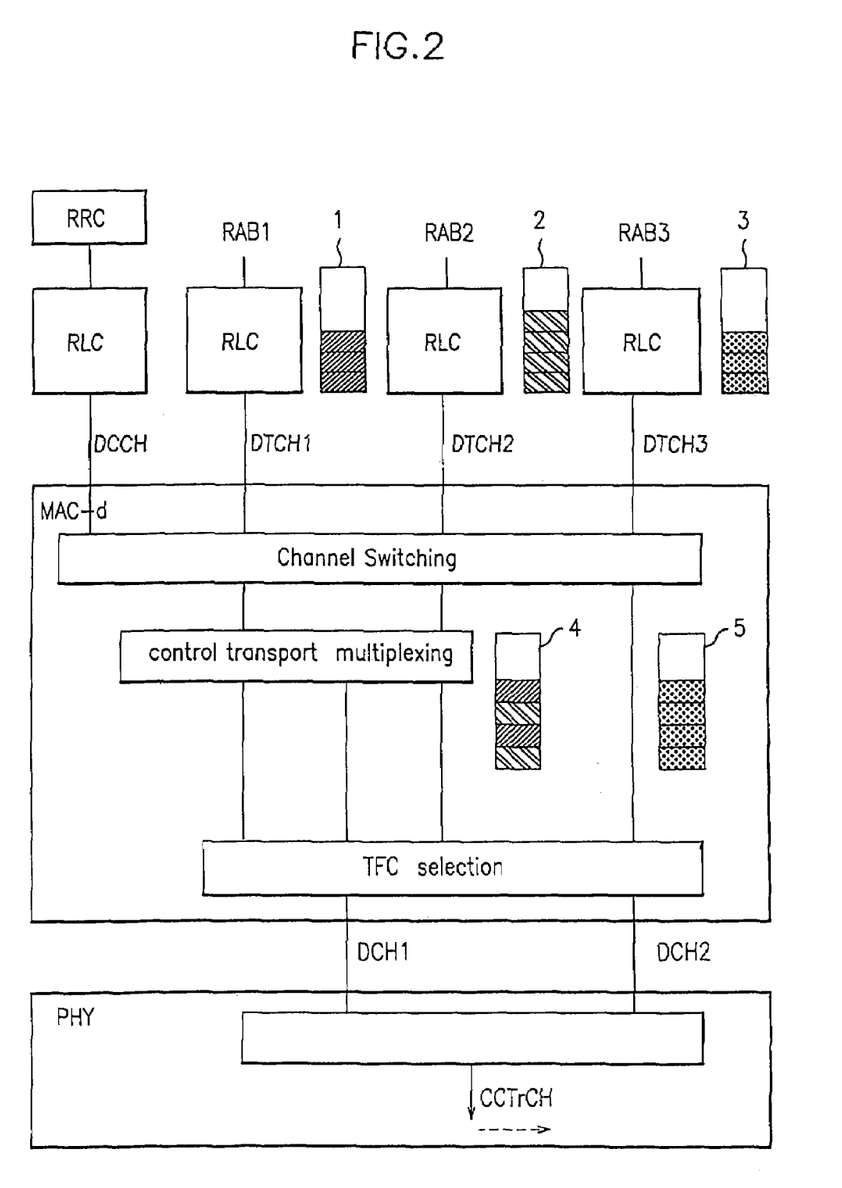
FIG. 2 illustrates a diagram showing a system of protocol entities for explaining a procedure for controlling an active radio access bearer in accordance with a preferred embodiment of the present invention.

Reference will now be made in detail to the preferred embodiments of the present invention, examples of which are illustrated in the accompanying drawings. FIG. 2 illustrates a diagram showing a system of protocol entities for explaining a procedure for controlling an active radio access bearer in accordance with a preferred embodiment of the present invention, particularly, a state before a transport channel is switched in conducting traffic volume monitoring, and an initial state of the MAC. The MAC is disposed by the RRC including radio access bearers RAB1, RAB2 and RAB3 multiplexed into dedicated channels DCH1, and DCH2. The dedicated channels DCH1 are DCH2 are multiplexed into a Coded Composite Transport Channel (CCTrCH). After disposing the radio access bearers, the RRC disposes the lower three layers of the RLC, tkdr1, and MAC, and the physical layer (hereafter called as "PHY"). When these lower three layers are disposed, the RRC provides a disposal request primitive CMAC_configure_REQ to the MAC, which includes: first, radio access bearer identification (ID), second, a logical channel ID, which is multiplexing information, a transport channel ID, and a logical format priority according to a service quality (QoS), and third, a transport format combination set, which is transport channel information. Upon completion of disposal of the lower three layers, the RRC requests the MAC to carry out a traffic volume monitoring function.

Figure 3:
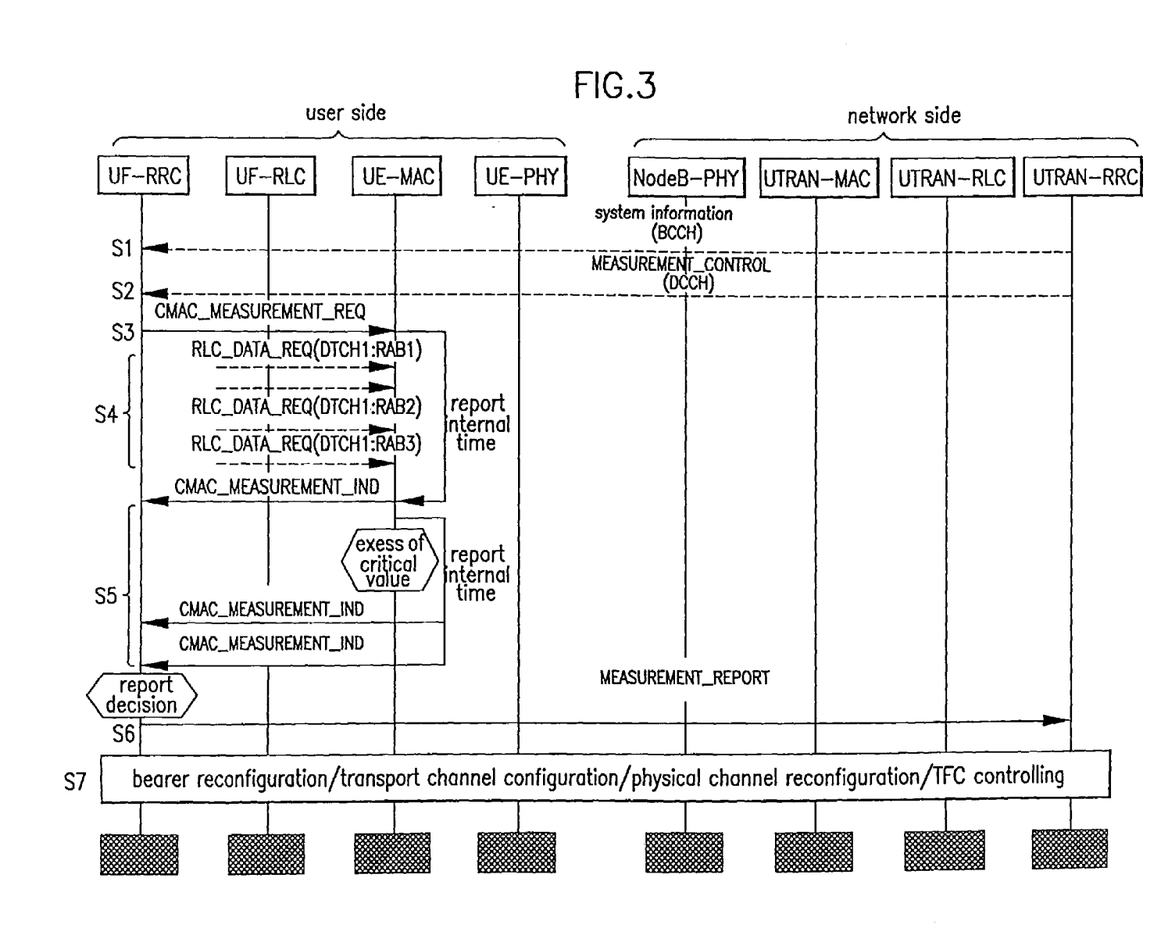
FIG. 3 illustrates a diagram showing a procedure for monitoring traffic volume for controlling an active radio access bearer in accordance with a preferred embodiment of the present invention.

FIG. 3 illustrates a flow of messages showing a procedure for monitoring traffic volume in accordance with a preferred embodiment of the present invention.

Referring to FIG. 3, before the process for monitoring traffic volume, the UTRAN-RRC provides a system information message to the UE-RRC through a BCCH (Broadcasting Control Channel) (S1), and a MEASUREMENT CONTROL message through a Digital Control Channel (DCCH). (S2). Eventually, the UE-RRC can have parameters required for the traffic volume measurement. Then, the UE-RRC requests the UE-MAC to carry out the traffic volume monitoring (S3). In this instance, the UE-RRC provides the UE-MAC with a primitive CMAC_MEASUREMENT_REQ, containing a measurement report mode parameter, and a measurement period parameter. If the measurement report mode is a periodic mode, a report interval parameter is added thereto, and if the measurement report mode is an event trigger mode, an upper critical value $TH_U$ parameter and a lower critical value $TH_L$ parameter are added thereto. The upper critical value $TH_U$ parameter denotes a greatest boundary traffic volume in reporting measurements to UE-MAC, and the lower critical value $TH_L$ parameter denotes a smallest boundary traffic volume in reporting measurement to the UE-MAC. Then, the UE-RLC provides the UE-MAC with states of respective buffers, and its own data through the primitive RLC_DATA_REQ at fixed intervals (S4). In this instance, as shown in FIG. 2, respective buffers are at transport RLC buffer 1, 2, and 3 states, and data inclusive of the respective buffer states are provided through a dedicated traffic channel (DTCH). If the present measurement report mode is a periodic mode, the UE-MAC receives results of measurements at the transport RLC buffers 1, 2, and 3, and results of measurements at its transport MAC buffers 4, and 5, and provides these to the UE-RRC, periodically. (S5). Conversely, if the present measurement report mode is an event trigger mode, the UE-MAC checks if the results of measurements at the transport RLC buffers 1, 2, and 3, and the results of measurements at its own transport MAC buffers 4, and 5 either exceed the upper critical value $TH_U$ or are lower than the critical value $TH_L$. If the results are outside the bounds $TH_U$ and $TH_L$, then they are reported to the UE-RRC (S5).

In the foregoing step S5, the UE-MAC uses the primitive CAMC_MEASUREMENT_IND, together with the following parameters in reporting to UE-PRC. First, a sum of data existing at the transport RLC buffers 1, 2, and 3, and the transport buffers 4, and 5 corresponding to the traffic volume transported through the CCTrCH of the PHY is used. In other words, a sum of data existing at buffers of all transport channels and all data existing at buffers of logical channels, multiplexed by the CCTrCH, is used. The sum of data forms the measurement results reported to the UE-RRC described in the step S5. As other parameters, states of respective buffers the UE-RLC provides to the UE-MAC at every interval through the primitive RLC_DATA_REQ are used. That is, the amounts of data corresponding to respective radio access bearers RAB1, RAB2, and RAB3 are used. In this instance, as statistic values obtained by measuring respective buffer data for a given time period, averages and deviations of amounts of data existing at respective buffers are used. As another parameters, averages and deviations of amounts of traffic transported through respective transport channels, and statistics of measurement of respective channels for a given time period are used.

Then, upon reception of the measurement results on the buffer states from the UE-MAC, the UE-RRC provides the measurement results on the buffer states to the UTRAN-RRC (S6). In this instance, the measurement results are provided through the DCCH, and primitive MEASUREMENT_REPORT_MESSAGE is used.

Finally, the UTRAN-RRC controls the radio access bearer with reference to, or according to, a result of the report of the measurement results.

The radio access bearers may be controlled by bearer reconfiguration, transport channel reconfiguration, physical channel reconfiguration, and TFC (Transport Format Combination) (S7). The bearer reconfiguration is required for correcting transport channels of the RLC, and MAC, and a configuration of the PHY entirely, and the transport channel reconfiguration is required for correcting the transport channel of the MAC and a configuration of the PHY. The physical channel reconfiguration is also required for correcting a configuration of the PHY. Thus, upon completion of the procedure for controlling the radio access bearers, the UTRAN_RRC provides new critical values to the UE-RRC, and the UE-RRC provides the new critical values to the UE-MAC. According to this, the MAC uses the new critical values provided thereto in carrying out the traffic volume monitoring function. By the way, if the received critical value drops below a specific level continuously while the MAC carries out the traffic volume monitoring function continuously and MAC receives the new critical values continuously, the transport channel type is changed from a Dedicated Channel (DCH) to a Random Access Channel (RACH). That is, the form or type of transport channel is switched.

Figure 4A:
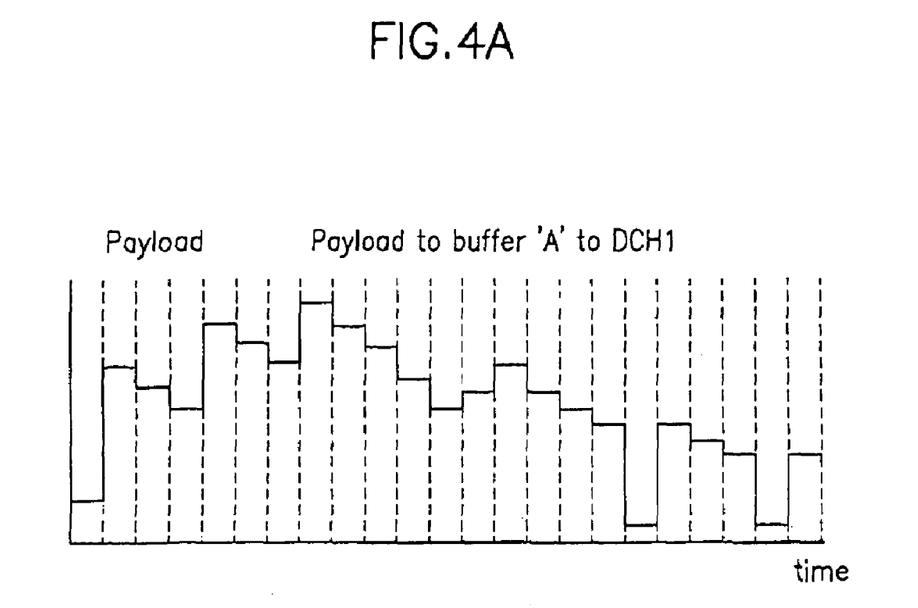
FIGS. 4A-4C illustrate states of buffers in protocol entities for controlling an active radio access bearer in accordance with a preferred embodiment of the present invention.
Figure 4B:
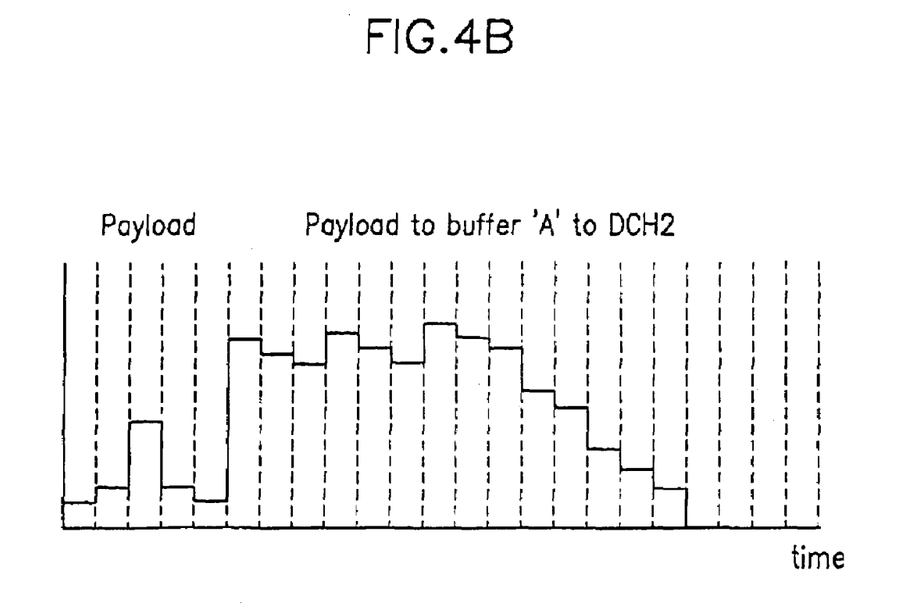
Figure 4C:
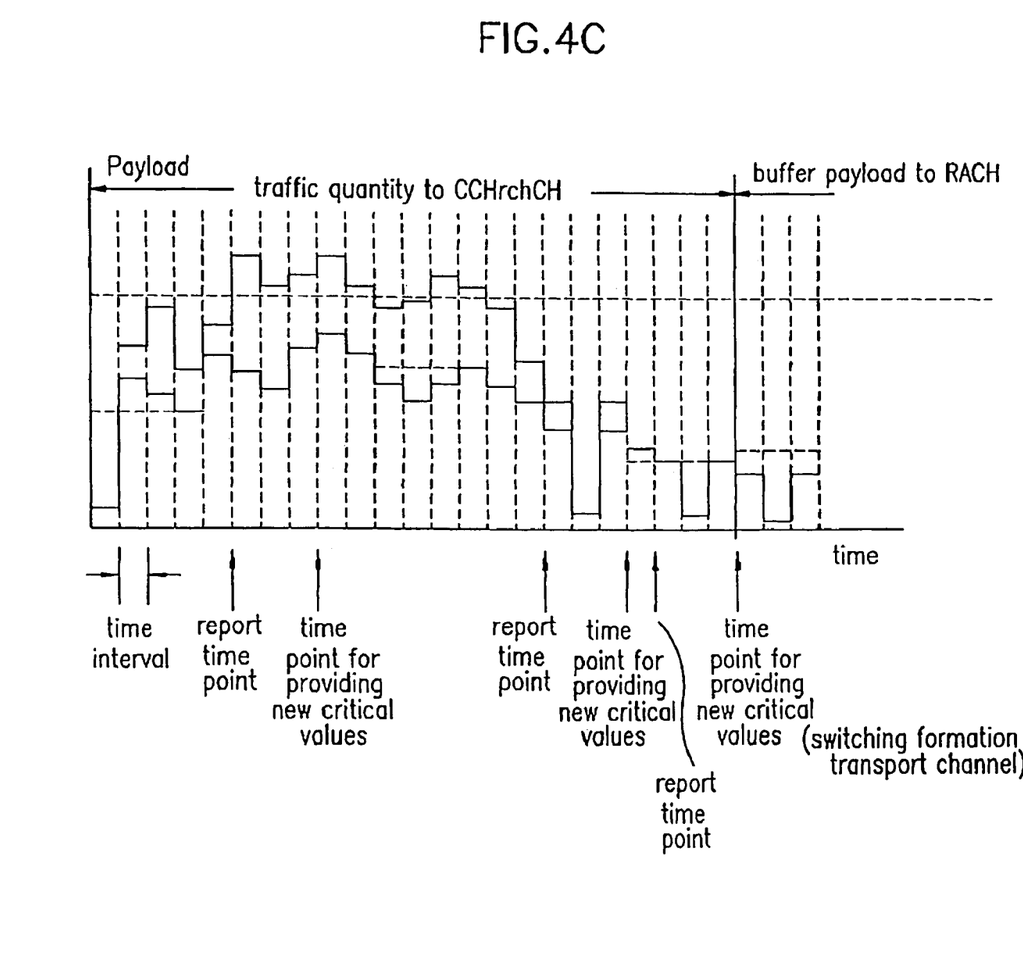
Figure 5:
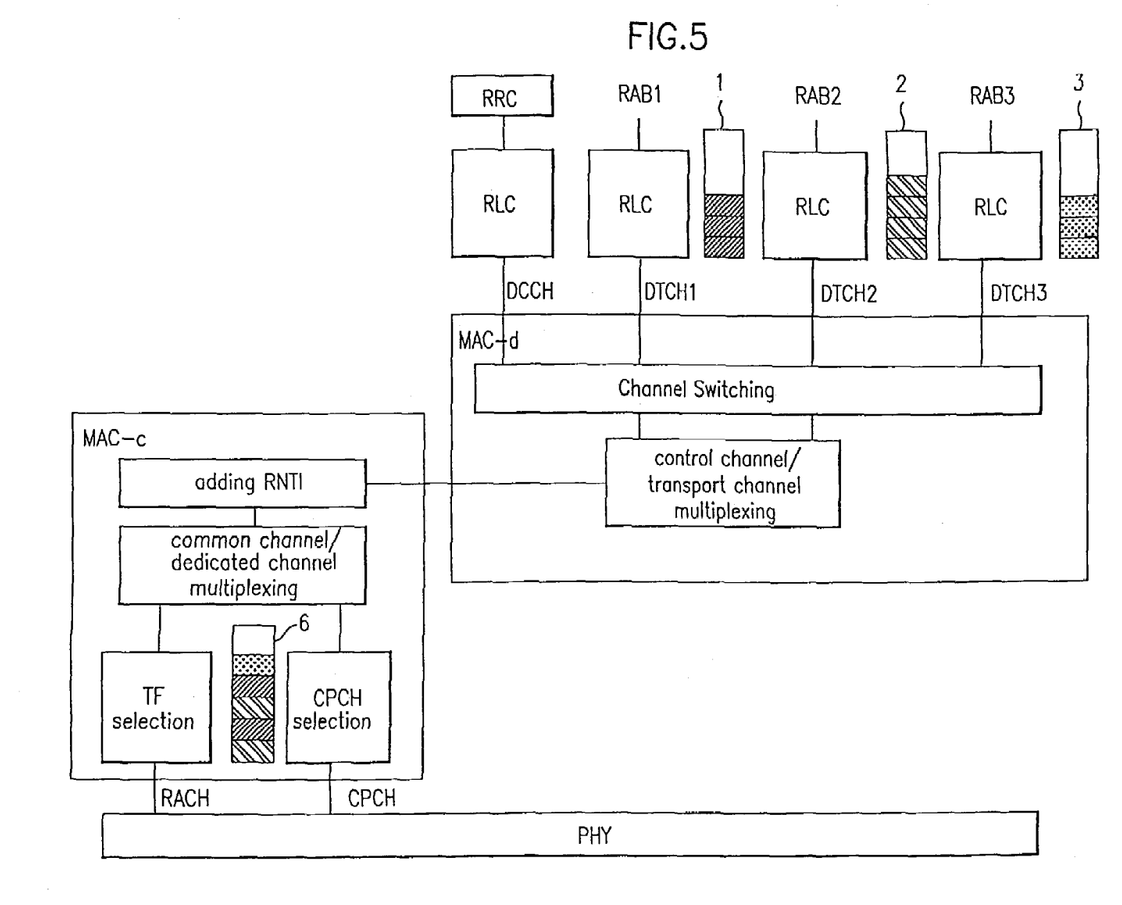
FIG. 5 illustrates another system of protocol entities explaining a procedure for controlling an active radio access bearer in accordance with a preferred embodiment of the present invention; and, FIG. 6 illustrates a flow chart showing a process for monitoring traffic volume for controlling an active radio access bearer in accordance with a preferred embodiment of the present invention.

FIGS. 4A-4C illustrate how states of buffers in protocol entities in a traffic volume monitoring process change with time. FIG. 5 illustrates the radio interface protocol architecture after the switching of a transport channel type occurs in the traffic volume monitoring process. From FIG. 5, it can be seen that the PDU (Protocol Data Unit) of the RLC is transported, not through the dedicated MAC (MAC-d), but through a common MAC (MAC-c).

Figure 6:
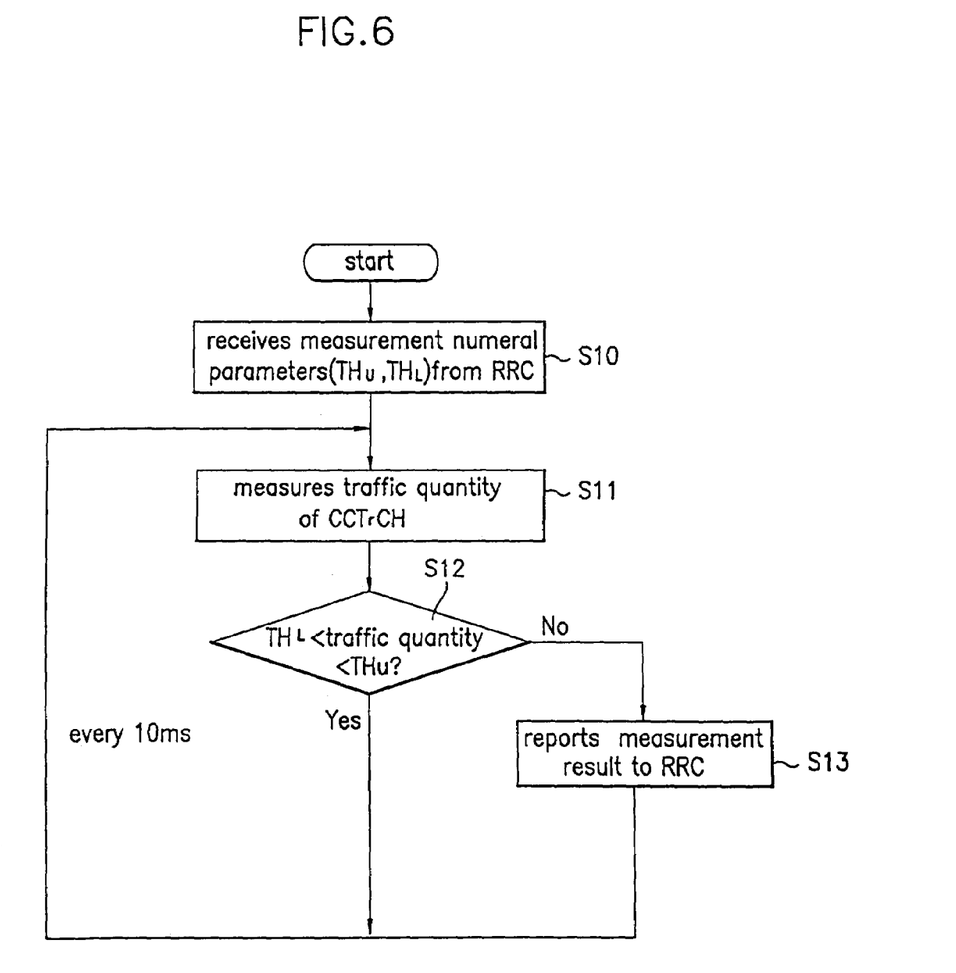

FIG. 6 illustrates a flow chart showing a process for monitoring traffic volume for controlling radio access bearers in accordance with a preferred embodiment of the present invention. In order to make explanation of FIG. 6 clearer, the explanation also will refer to FIGS. 2-5.

First, the MAC is provided with measurement parameters, inclusive of the upper critical value $TH_U$ and the lower critical value $TH_L$ provided from the RRC (S10). Basically, the MAC is provided with a RLC PDU from each of the RLCs which transports different radio access bearers RAB1, RAB2, and RAB3, and, at the same time, a state of each of the transport RLC buffers 1, 2, and 3 corresponding to respective radio access bearers from the RLC. Then, the MAC measures the a sum of data existing at the transport RLC buffers 1, 2, and 3, and the transport MAC buffers 4, and 5, which corresponds to the traffic volume transported through the CCTrCH (S11). Then, the MAC compares the traffic volume measurement of the channel CCTrCH to the upper critical value $TH_U$ and the lower critical value $TH_L$ provided from the RRC (S12). If the measured traffic volume of the channel CCTrCH is a value falling between the upper critical value $TH_U$ and the lower critical value $TH_L$, the traffic volume measurement of the channel CCTrCH is measured at fixed intervals (for example, at every 10 ms). However, if the traffic volume measurement of the channel CCTrCH falls outside of the range between the upper critical value $TH_U$ and the lower critical value $TH_L$, then the result of the traffic volume measurement of the channel CCTrCH is provided to the RRC (S13). Then, the RRC undertakes a procedure for controlling the radio access bearers based on the traffic volume measurement of the channel CCTrCH provided thereto. The procedure for controlling the radio access bearers has been explained already.

As has been explained, the method for active control of a radio access bearer in a mobile communication system of the present invention has the following advantages.

A procedure for controlling radio access bearers is provided in more detail over the traffic volume monitoring. Therefore, establishment, sustenance, and cancelation of radio resource access can be carried out efficiently in the radio interface protocol architecture according to traffic volumes of the RLC and MAC, which are sub-layers of the second layer.

And, the functions of establishment, sustenance, and cancelation of the radio access bearers and the radio resources required for radio resource access can be carried out more efficiently.

It will be apparent to those skilled in the art that various modifications and variations can be made in the method for controlling a radio access bearer in a mobile communication system of the present invention without departing from the spirit or scope of the invention. Thus, it is intended that the present invention cover the modifications and variations of this invention provided they come within the scope of the appended claims and their equivalents.

What is claimed is:

1. A method for controlling radio bearers in a mobile communications device having a radio resource control layer, a radio link control layer, a medium access control layer, and a physical layer beneath the radio resource control layer in succession, comprising:
  receiving a measurement control message from the radio resource control layer, the measurement control message including a measurement report mode;
  measuring traffic volume between the medium access control layer and the physical layer;
  checking whether a condition according to the measurement report mode is satisfied;
  reporting the measured traffic volume to the radio resource layer, when the condition is satisfied; and
  controlling the radio bearers by the radio resource control layer according to the measured traffic volume.

2. The method of claim 1, the checking step further comprising, when the measurement report mode is an event trigger mode:
  comparing the measured traffic volume to at least one threshold value, wherein at least one threshold value includes at least one of an upper critical value and a lower critical value.

3. The method of claim 2, wherein the condition is satisfied when the measured traffic volume is larger than the upper critical value.

4. The method of claim 2, wherein the condition is satisfied when the measured traffic volume is smaller than the lower critical value.

5. The method or claim 1, wherein the measured traffic volume is reported periodically, when the measurement report mode is a periodic mode.

6. The method of claim 1, wherein the steps of measuring, checking, and reporting are performed in the medium access control layer.

7. The method of claim 1, wherein the mobile communications device is a device in a network communicating with at least one mobile terminal.

8. The method of claim 1, wherein the mobile communications device is a mobile terminal.

9. The method of claim 2, wherein the measurement control message further includes at least one of an upper critical value and a lower critical value.

10. The method of claim 5, wherein the measurement control message includes a reporting period.

11. The method of claim 7, wherein the measurement control message is transmitted from the radio resource control layer in the network to the radio resource control layer in at least one mobile terminal through a dedicated control channel.

12. The method of claim 8, further comprising reporting traffic volume information to a radio resource control layer in a network communicating with the mobile terminal.

13. The method of claim 12, wherein the traffic volume information is at least one of the measured traffic volume, an average of the measured traffic volume, and a variance of the measured traffic volume.

14. The method of claim 1, wherein the measurement control message further includes a time interval for calculating one of an average of the measured traffic volume, and a variance of the measured traffic volume.

15. The method of claim 12, wherein the traffic volume information is reported through a dedicated control channel.

16. The method of claim 1, wherein the radio resource control layer controls the radio bearers by using at least one of radio bearer reconfiguration, transport channel reconfiguration, and physical channel reconfiguration.

17. The method of claim 1, wherein the step of measuring traffic volume is performed on every transmission time interval (TTI).

18. A method for controlling radio bearers in a mobile communications device having a radio resource control layer, a radio link control layer, a medium access control layer, and a physical layer beneath the radio resource control layer in succession, comprising;
  transferring a measurement control message to the medium access control layer, the measurement control message including a measurement report mode, wherein the measurement report mode is at least one of an event trigger mode and a periodic mode;
  receiving traffic volume information between the medium access control layer and the physical layer from the medium access control layer according to the measurement report mode; and
  controlling the radio bearers according to the traffic volume information.

19. The method of claim 18, further comprising, when the measurement mode is the event trigger mode:
  measuring the traffic volume between the medium, access control layer and the physical layer; and
  comparing the measured traffic volume to at least one threshold value, wherein at least one threshold value includes at least one of an upper critical value and a lower critical value.

20. The method of claim 19, wherein the measurement control message further includes at least one of an upper critical value and a lower critical value.

21. The method of claim 19, wherein the measuring and comparing steps are performed in the medium access control layer.

22. The method of claim 18, further comprising, when the measurement mode is the periodic mode:
  checking whether a reporting period is elapsed in the medium access control layer.

23. The method of claim 22, wherein the measurement control message further includes the reporting period.

24. The method of claim 18, wherein each step is performed in the radio resource control layer.

25. The method of claim 18, wherein the mobile communications device is a device in a network communicating with at least one mobile terminal.

26. The method of claim 18, wherein the mobile communications device is a mobile terminal.

27. The method of claim 26, wherein the, measurement control message is transmitted from the radio resource control layer in the network to the radio resource control layer in at least one mobile terminal through a dedicated control channel.

28. The method of claim 26, further comprising reporting traffic volume information to a radio resource control layer in a network communicating with the mobile terminal.

29. The method of claim 28, wherein the traffic volume information is at least one of the measured traffic volume, an average of the measured traffic volume, and a variance of the measured traffic volume.

30. The method of claim 20, wherein the measurement control message further includes a time interval for calculating one of an average of the measured traffic volume, and a variance of the measured traffic volume.

31. The method of claim 28, wherein the traffic volume information is reported through a dedicated control channel.

32. The method of claim 18, wherein the radio resource control layer controls the radio bearers by using at least one of radio bearer reconfiguration, transport channel reconfiguration, and physical channel reconfiguration.

33. The method of claim 18, wherein the step of measuring traffic volume is performed on every transmission time interval (TTI).

34. An apparatus for controlling radio bearers in a mobile communications system, the apparatus having a plurality of protocol layers including a radio resource control layer, a radio link control layer, a medium access control layer, and a physical layer beneath the radio resource control layer in succession, comprising:
    means for receiving a measurement control message from the radio resource control layer, the measurement control message including a measurement report mode;
    means for measuring traffic volume between the medium access control layer and the physical layer;
    means for checking whether a condition according to the measurement report mode is satisfied;
    means for reporting the measured traffic volume to the radio resource layer, when the condition is satisfied; and
    means for controlling the radio bearers according to the measured traffic volume.

35. The apparatus of claim 34, the checking means comprising, when the measurement report mode is an event trigger mode:
    means for comparing the measured traffic volume to at least one threshold value, wherein at least one threshold value includes at least one of an upper critical value and a lower critical value.

36. The apparatus of claim 35, wherein the condition is satisfied when the measured traffic volume is larger than the upper critical value.

37. The apparatus of claim 35, wherein the condition is satisfied when the measured traffic volume is smaller than the lower critical value.

38. The apparatus of claim 34, wherein the measured traffic volume is reported periodically, when the measurement report mode is a periodic mode.

39. The apparatus of claim 34, wherein the apparatus is a mobile terminal.

40. The apparatus of claim 35, wherein the measurement control message further includes at least one of an upper critical value and a lower critical value.

41. The apparatus of claim 38, wherein the measurement control message further includes a reporting period.

42. The apparatus of claim 39, further comprising means for reporting traffic volume information to a radio resource control layer in a network communicating with the mobile terminal.

43. The apparatus of claim 42, wherein the traffic volume information is at least one of the measured traffic volume, an average of the measured traffic volume, and a variance of the measured traffic volume.

44. The apparatus of claim 34, wherein the means for controlling the radio bearers controls the radio bearers by using at least one of radio bearer reconfiguration, transport channel reconfiguration, and physical channel reconfiguration.

45. The apparatus of claim 36, wherein the means for measuring the traffic volume measures the traffic volume on every transmission time interval (TTI).

* * * * *